United States Patent
Borle et al.

(10) Patent No.: US 10,243,696 B2
(45) Date of Patent: Mar. 26, 2019

(54) DIVERSITY COMBINING OF NON-COHERENTLY MODULATED LDPC CODES IN WIRELESS COMMUNICATIONS

(71) Applicants: Kapil Borle, Watertown, MA (US);
Biao Chen, Jamesville, NY (US);
Fangfang Zhu, Bridgewater, NJ (US);
Yu Zhao, Somerville, MA (US)

(72) Inventors: Kapil Borle, Watertown, MA (US);
Biao Chen, Jamesville, NY (US);
Fangfang Zhu, Bridgewater, NJ (US);
Yu Zhao, Somerville, MA (US)

(73) Assignee: Syracuse University, Syracuse, NY (US)

( * ) Notice: Subject to any disclaimer, the term of this patent is extended or adjusted under 35 U.S.C. 154(b) by 92 days.

(21) Appl. No.: 14/950,191

(22) Filed: Nov. 24, 2015

(65) Prior Publication Data

US 2017/0201347 A1  Jul. 13, 2017

Related U.S. Application Data

(60) Provisional application No. 62/084,190, filed on Nov. 25, 2014.

(51) Int. Cl.
*H04L 1/00* (2006.01)
*H04B 7/08* (2006.01)

(52) U.S. Cl.
CPC .............. *H04L 1/0054* (2013.01); *H04B 7/08* (2013.01); *H04B 7/0885* (2013.01); *H04L 1/0045* (2013.01); *H04L 1/0057* (2013.01)

(58) Field of Classification Search
CPC .................................................... H04L 1/0054

USPC ......................................................... 375/341
See application file for complete search history.

(56) References Cited

U.S. PATENT DOCUMENTS

| | | | | |
|---|---|---|---|---|
| 5,557,612 A | * | 9/1996 | Bingham | H04L 1/0025 370/449 |
| 6,044,272 A | * | 3/2000 | Kobylinski | H04W 36/26 370/331 |
| 2004/0001564 A1 | * | 1/2004 | Chan | H04L 1/005 375/341 |
| 2007/0223618 A1 | * | 9/2007 | Jeong | H04B 7/0473 375/267 |
| 2007/0268988 A1 | * | 11/2007 | Hedayat | H04B 7/0851 375/347 |
| 2014/0192936 A1 | * | 7/2014 | Fukawa | H04B 7/0854 375/341 |

* cited by examiner

*Primary Examiner* — Lihong Yu
(74) *Attorney, Agent, or Firm* — Bond Schoeneck and King PLLC; David Nocilly; George McGuire

(57) ABSTRACT

A method of decoding a plurality of diverse signals for low-density parity-check (LDPC) decoders that takes advantage of signal diversity. The method allows for the combining of soft-decision LDPC encoded non-coherently modulated signals, which is in contrast to existing approaches where hard decision combining is used for non-coherently modulated signals. The method includes the steps of inputting each diversity signal into a unique demodulator, and calculating the LLR of each demodulated signal. When the diverse demodulated signals are combined into a single combined signal, each bit of the combined signal is selected according to the value of either the highest LLR value of each bit across the demodulated signals or according to the sum of the LLR of each bit across the demodulated signals.

11 Claims, 6 Drawing Sheets

DIVERSITY COMBINING OF NON-COHERENTLY MODULATED LDPC CODES IN WIRELESS COMMUNICATIONS

CROSS-REFERENCE TO RELATED APPLICATIONS

This application claims priority to U.S. Provisional Application No. 62/084,190, filed on Nov. 25, 2014.

STATEMENT REGARDING FEDERALLY SPONSORED RESEARCH

This invention was made with government support under Grant No. CCF0905320 awarded by the National Science Foundation (NSF) and Grant No. FA8750-11-1-0040 awarded by the Air Force Research Lab (AFRL). The government has certain rights in the invention.

BACKGROUND OF THE INVENTION

1. Field of the Invention

The present invention relates to a method for signal processing generally, and more particularly, to a method for decoding multiple wireless signals in the presence of signal diversity.

2. Description of the Related Art

A. Coherent and Non-Coherent Modulation

Phase shift keying (PSK) and quadrature amplitude modulation (QAM) are the most widely used modulation schemes in digital communications. For both modulations, the phase of the signal carries the information that needs to be recovered at the receiver. Coherent modulation uses the absolute phase of the signal to represent the information whereas non-coherently modulated schemes, e.g., those implementing differential encoding, embeds the information in the phase difference between consecutive symbols. As such, for coherent modulation, one needs to keep track of the channel state, especially the channel phase information, whereas for differentially encoded signals, there is no such need so long as the channel coefficients do not vary much from time to time.

In certain applications, coherent modulation schemes are less favored because tracking channel state information puts an additional burden on the communication system, which is exacerbated with fast fading channels in a mobile environment. Thus in many practical systems such as satellite and radio relay communications, as well as in some cellular systems, non-coherent modulations are favored.

B. LDPC Codes

LDPC codes are a class of linear block codes with a particular characteristic in terms of their parity check matrix. Specifically, the fraction of nonzero entries is small, a property known as sparsity. LDPC codes provide a performance close to the Shannon limit for a number of important channels. In other words, one cannot expect to have codes that perform better than LDPC in terms of transmission rate and reliability tradeoff. Furthermore, the decoding algorithms have linear time complexity. These advantages, i.e., the superior error correction performance and simplicity in implementation makes it the most widely used error correction codes in existing and future wireless communications systems, including the digital television broadcast standard (DVB-S2), ITU-T G.hn standard. LDPC is also used for 10 GBase-T Ethernet, which sends data at 10 gigabits per second over twisted-pair cables. As of 2009, LDPC codes are also part of the Wi-Fi 802.11 standard as an optional part of 802.11n [4] and 802.11ac, in the High Throughput (HT) PHY specification.

C. Hard and Soft Decoding

The decoding algorithms for LDPC codes can be classified into two main categories: hard-decision decoding and soft-decision decoding. The difference between the two lies in the inputs that are taken in by the algorithm. For the hard-decision decoding, the inputs are decoded symbols from the demodulator, while likelihood ratio values are inputs for the soft-decision algorithms. In other words, the hard decision-decoding algorithm receives only that data which is received from the demodulator. If the data has been corrupted during transmission, or signal-loss has otherwise occurred, the corrupted information will be demodulated as-is and sent to the algorithm, yielding potentially poor decoding performance. Soft-decision decoding, based on the concept of belief propagation, will return a received value, along with a form of confidence metric so that the algorithm can make a better decision about the original information sent from the transmitter. As a result, soft-decision decoding yields a better decoding performance and is therefore the preferred method where possible.

In recent communication systems, multiple independently received signal copies of the same message are often available at the receiver—this is known as diversity reception. Diversity reception will occur in a variety of situations including, retransmission in packet based systems, multi-channel environments, and multi-antenna receivers that have become prevalent in almost all current and likely future wireless systems. Diversity reception provides the potential that the received signal be combined to recreate the original signal which often lead to significantly better reception compared with that of a single receive channel.

While non-coherent combining techniques have been studied for other channel codes, such as Trellis codes, and Turbo codes, there is a need for non-coherent combining techniques for LDPC coded signal. In particular, there is a need for a diversity combining scheme for non-coherent modulation with soft decisions to take advantage of the performance gain compared with the hard-decision combining scheme. Accordingly, there is a need in the art for a diversity combining scheme with soft decisions for LDPC coded signals.

BRIEF SUMMARY OF THE INVENTION

The present invention comprises a method for LDPC (low-density parity-check) decoders to take advantage of signal diversity is provided. The method enhances the decoding performance when more than one copies of the signals are available at the receiver side. This happens in most existing communication systems, such as the multi-channel environment, retransmissions over time, and in systems where receivers are equipped with multiple antennas. The method allows combining soft-decision output of non-coherently modulated signals, and provides robust SNR improvement over reception without diversity combining or hard-decision based diversity combining.

DETAILED DESCRIPTION OF THE INVENTION

Figure 1:
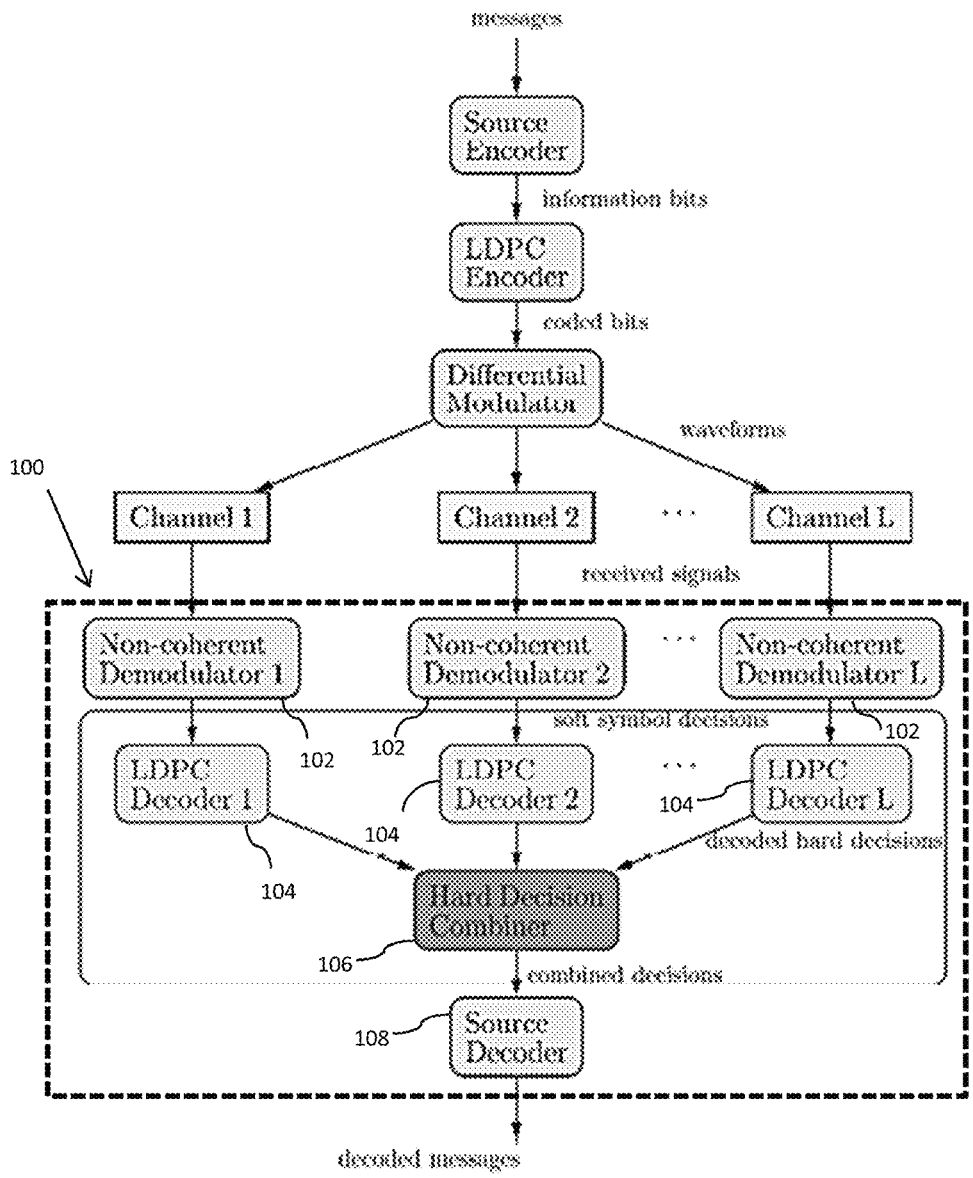
FIG. 1 depicts schematic of a communication system with hard decision combining according to an embodiment.

Referring now to the drawings wherein like reference numerals designate identical or corresponding parts through the several views, there is shown in FIG. 1 a schematic representation of a system 100, for a diversity combining scheme with soft decisions for LDPC coded signals.

As shown in FIG. 1, system 100 comprises a plurality of non-coherent demodulators 102, configured to receive a plurality of diverse RF signals (i.e. copies or versions of the same signal), depicted in FIG. 1 as channels 1, 2 . . . L. Demodulators are each configured to output a demodulated signal, to a plurality of LDPC 104 decoders. LDPC decoders 104 are, in turn, configured to output a decoded value for each received signal. Hard decoder 106 receives from each LDPC decoder a decoded signal, and forms a combined signal by taking the majority "vote" of the LDPC decoders.

Figure 2:
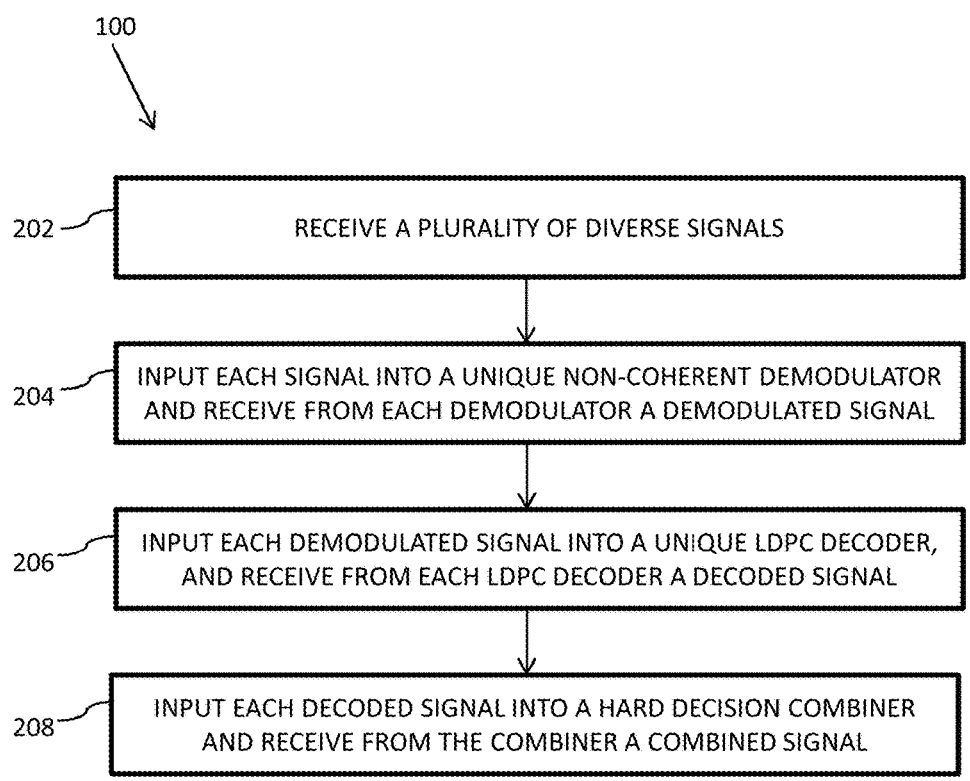
FIG. 2 depicts a flowchart of a method employing a hard decision combining system, according to an embodiment.

FIG. 2 shows a flowchart utilizing system 100 in an embodiment. In step 202, a plurality of RF signals are received over the air, shown in the figure as channels 1,2 . . . L. In an alternative embodiment the RF signals are received via a hardline or any other medium for transmitted electric signals known in the art. The RF signals received over each channel are simply diverse copies of one another. The RF signals may be reduced to the corresponding baseband signal, denoted as a sequence $y=\{y_0, y_1, \ldots, y_K\}$ that can be written as $$y_k = h_k x_k + n_k,$$

where k=1, 2, . . . is the symbol index, $h_k$ is the channel coefficient, and $n_k$ is a complex additive white Gaussian noise (AWGN) with zero mean and variance $2\sigma^2$. The channel coefficient $h_k$ can be written as $h_k = \rho_k e^{j\varphi_k}$.

Next, in step 204, each channel's RF signal is sent through a unique non-coherent demodulator 102, which each output a demodulated signal. Any non-coherent demodulator known in the art and suitable for demodulating LDPC encoded RF signals may be used. In an alternative embodiment, a coherent demodulator may be used for coherent signals.

In step 206, each channel's received RF signal is sent through a distinct LDPC decoder 104. Each LDPC decoder 104 processes the received signal to output a decoded signal.

In step 208, each decoded signal is then input to a hard decision combiner, 106. Hard decision combiner 208 combines the decoded signals by taking a "majority vote" between the LDPC Decoders 104. In other words, for each bit, the bit value selected by the most LDPC decoders 104 is selected as the bit value of the combined signal. For example, if two of LDPC decoders 104 select 1 as the value of the first bit, but only one LDPC decoder 104 selects 0 as the value of the first bit, then the first bit of the combined signal will be 1, because that was the value selected by the majority of the LDPC decoders 104. This process is known as hard-decision combining (HDC).

However, this embodiment is not ideal. The combined codeword after the vote may be invalid, which cannot be mapped into any known transmitted message sequence. Furthermore, it becomes ambiguous for some of the decisions when the number of branches is even, as a tied vote may result. More importantly, having multiple LDPC decoders takes up tremendous computation resources. To overcome the computational complexity, it is realistic to combine the receiving signals before the LDPC decoder, as depicted in FIG. 3.

Figure 3:
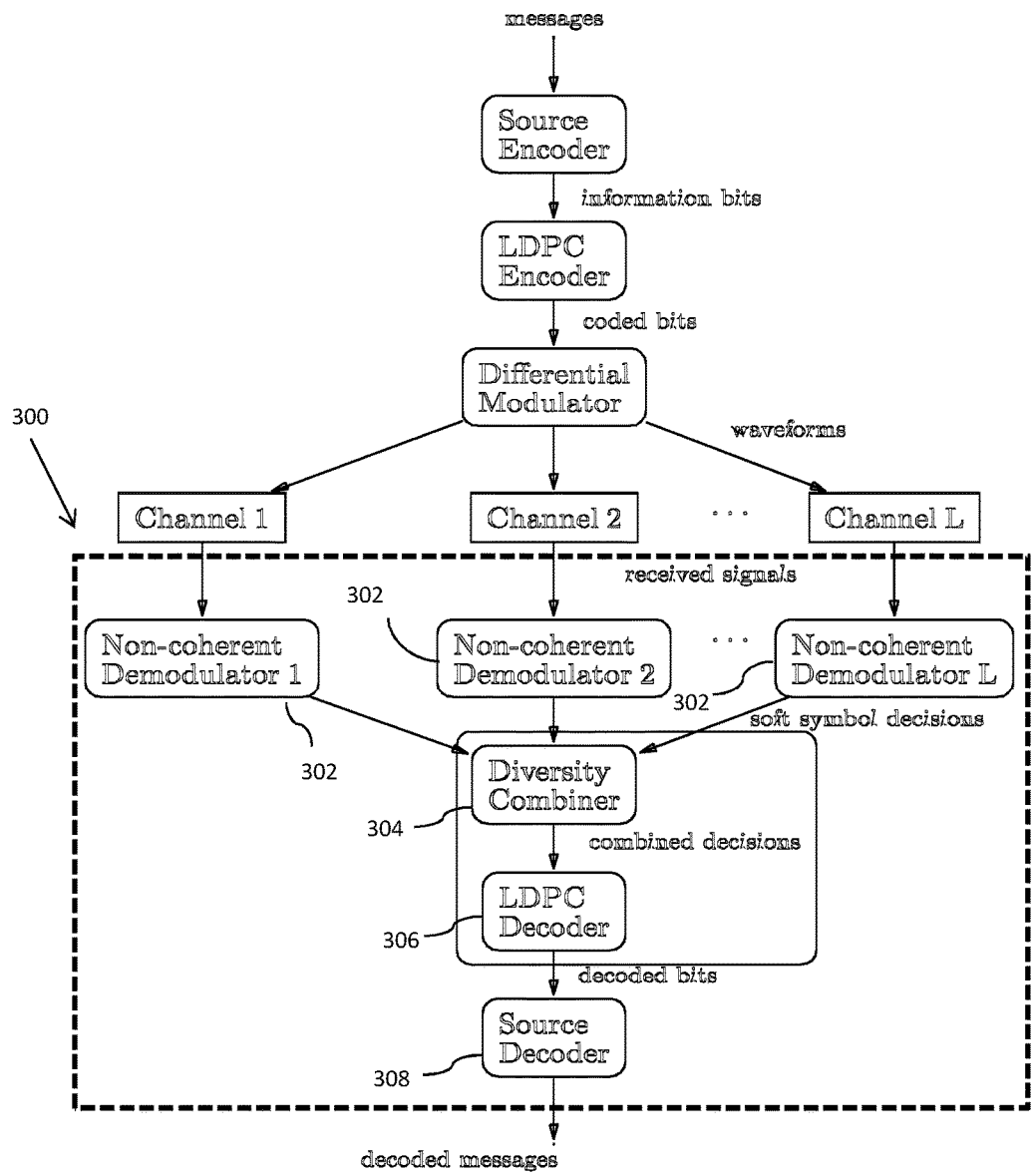
FIG. 3 depicts a schematic of a communication system with soft decision combining according to an embodiment.

FIG. 3 shows a second system 300 according to an embodiment. As shown, only one decoder is needed despite of the number of branches. System 300 comprises a plurality of non-coherent demodulators 302, each receiving a different version of a diversity signal (this is the same as system 100). Demodulators 302 output the demodulated signals to a diversity combiner 304. Diversity combiner 304 combines the received demodulated signals and outputs a combined signal to a single LDPC decoder 306. Thus, prior to processing each signal with an LDPC decoder, the signal is combined. To combine the demodulated signals, diversity combiner 304 must employ a rule or set of rules (also described herein as a scheme) to determine which value to select for each of the received bits.

In order to select the bits of the combined signal, the LLR of the outputs of the demodulators may be employed In binary modulation schemes, the LLR is expressed as the following:

$$I_k = \log \frac{p(y_k, y_{k-1} \mid m_k = 0)}{p(y_k, y_{k-1} \mid m_k = 1)}$$

where $m_k$ denotes the coded bit before differential modulation. For each of L independent branches available, let LLR(l) (1≤l≤L) denote each diversity reception after non-coherent demodulation.

In one embodiment, using the LLR, for each bit, the value of the bit out of multiple copies having the best LLR is selected. In other words, the value of the bit with the largest magnitude LLR is selected for each bit, i.e., $$SC = LLR(l^*), \; l^* = \arg\max_{1 \leq l \leq L} |LLR(l)|.$$

This methodology will be referred to hereafter as selection combining (SC). As switching among the branches for the one with the highest confidence, the SC method may have better performance than a single decoding without combining. For channels with significantly different conditions, this approach performs fairly well as it ignores the information gathered from worse channels. However, if the channel conditions in each branch are alike, the LLRs are not of much difference. Therefore, the performance improvement is limited, especially in highly noisy channel conditions. A second combining scheme (rule set), hereinafter referred to as the likelihood ratio combining (LRC) technique, takes advantage of all received copies via diverse channels. In LRC, the LLRs for each bit are added with equal gain, that is $$LLR = \sum_{l=1}^{L} LLR(l).$$

The operation of addition is considered because of the independence of each received version of the signals given the common input (i.e., that sent by the transmitter). By adding LLRs together, the estimation of each bit from each branch is weighted by their own confidence of their decisions. The confidence decreases as the noise increases, which serves the goal naturally. Hence, better performance is obtained by integrating all the available information together.

Figure 4:
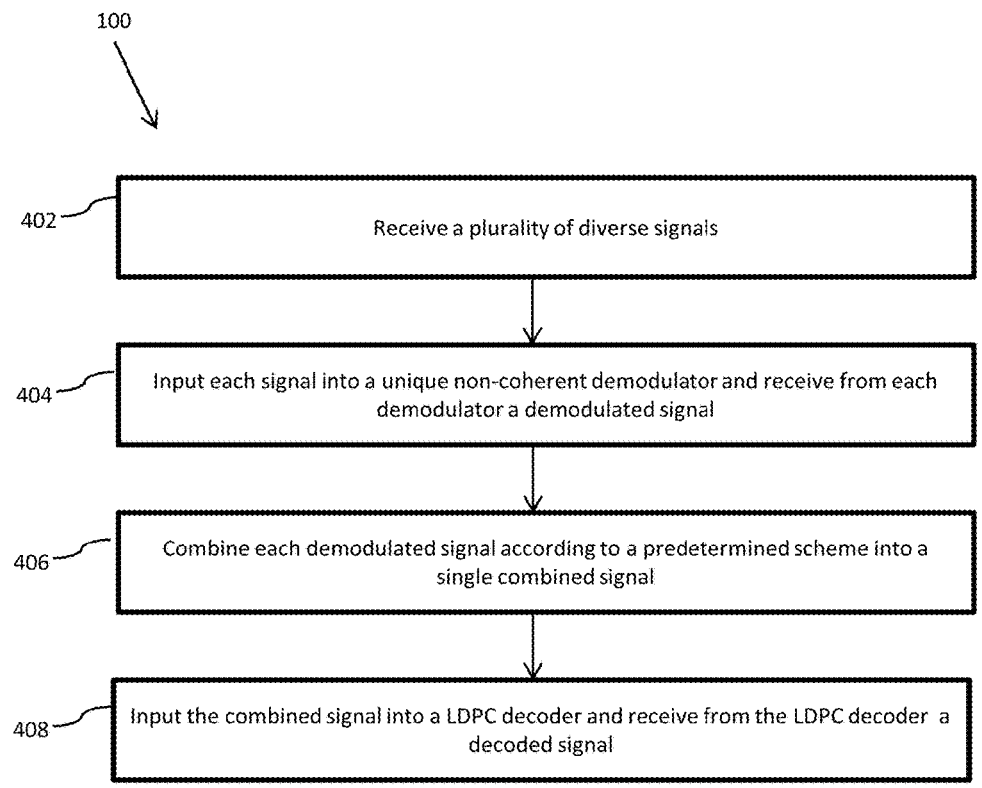
FIG. 4 depicts a flowchart of a method employing a soft decision combining system, according to an embodiment.

FIG. 4 shows a flowchart of a method employing system 300, according to an embodiment. In step 402, a plurality of diverse signals are received. In step 404, each received diverse signal is input into a unique non-coherent demodulator 302 (or, in an alternate embodiment, a coherent demodulator), each of which output a demodulated signal. At step 404, the demodulated signals are input into diversity combiner 304. Diversity combiner 304, employing a predetermined scheme, such as SC or LRC, combines the received demodulated signals into a single combined signal. And finally, at step 406, the combined signal is input into a single LDPC decoder, which outputs a decoded signal.

EXAMPLE

Figure 5:
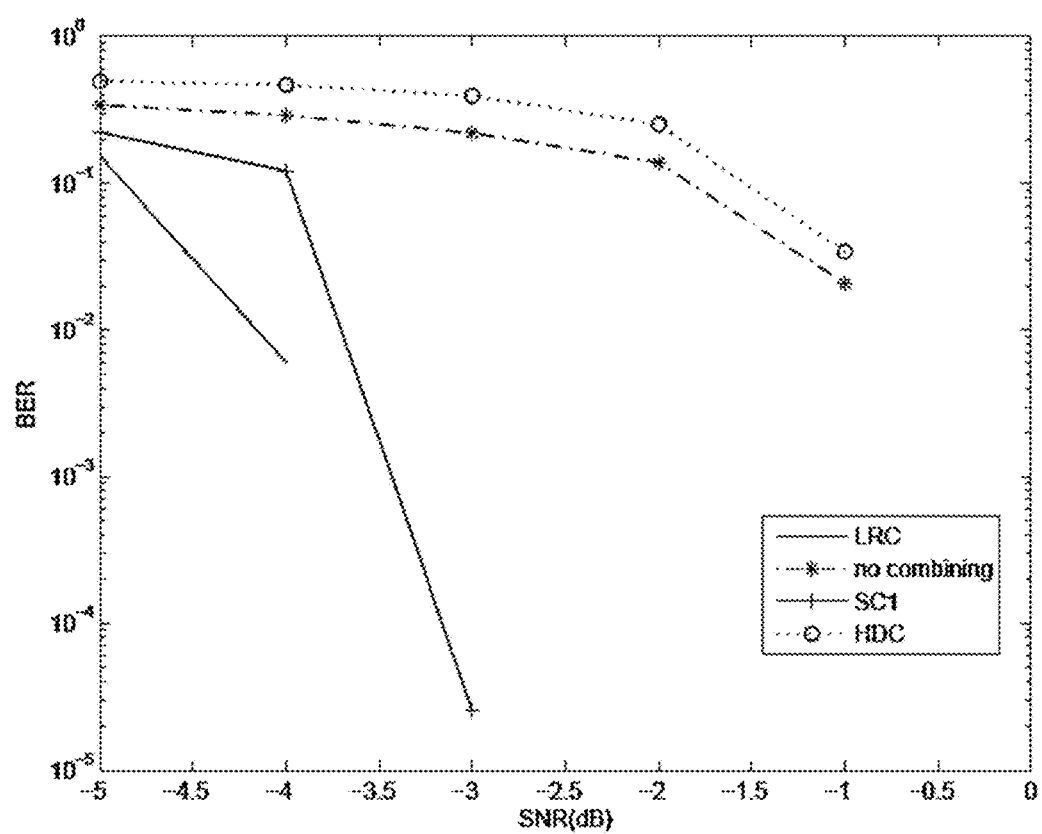
FIG. 5 depicts a graph comparing BER for combining over three Gaussian channels.
Figure 6:
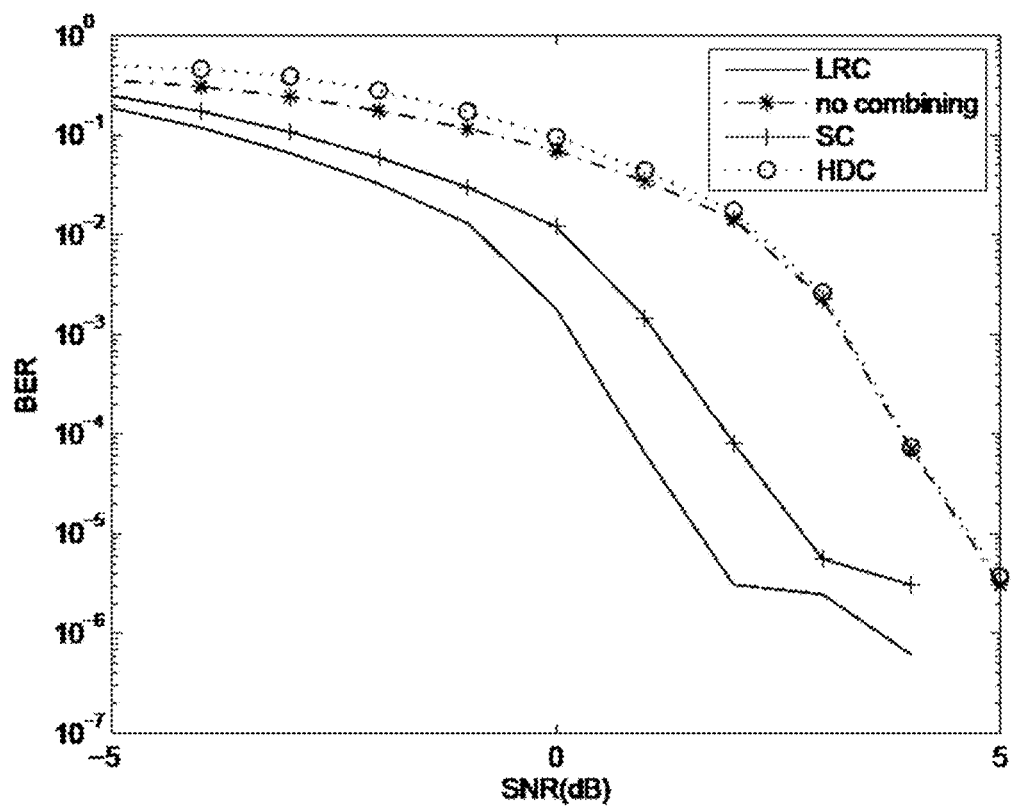
FIG. 6 depicts a graph comparing BER for combining over three Rayleigh fading channel.

DVB standard LDPC codes were used with code rate ¼. The message length and codeword length were 16200 and 64800 bits. As for the modulation, BPSK with differential encoding and non-coherent detection was adopted. The ways to calculate the LLR are known in the art. 2 types of channels were simulated: Gaussian channels with unknown fixed channel coefficient (both magnitude and phase), and Rayleigh fading channels with randomized channel coefficient. Moreover, three branches of received signals were assumed, in which the channel conditions were alike. The performances of the different combining techniques are compared in FIG. 5 and FIG. 6. FIG. 5 depicts the results of the different combining techniques of SC, HDC, LRC, and no combining over three Gaussian channels. FIG. 6 similarly depicts the results of the different combining techniques of SC, HDC<LRC, and no combining over three Rayleigh fading channels.

The BER (bit error rate) curve ends when the decodes message bits are free of errors. From the simulation results, the LRC had the best performance, and 3 dB effective SNR (signal to noise power ratio) gain was obtained in Gaussian channels compared to the reception without combining as well as that with HDC. Note that this 3 dB SNR gain is significant in practice as it implies that LRC can transmit at only half the power level as the single branch system while achieving the same bit error performance. SC has reasonable improvements over no combining and HDC, but is not as good as LRC. Similar performance was obtained in Rayleigh fading channels.

The invention claimed is:

1. A method of decoding signals, comprising the steps of:
   receiving a plurality of diverse low-density parity-check (LDPC) encoded and non-coherently modulated signals;
   inputting each of the plurality of diverse LDPC encoded and non-coherently modulated signals into a corresponding one of a plurality of non-coherent demodulators;
   demodulating the plurality of diverse LDPC encoded and non-coherently modulated signals to produce a plurality of corresponding soft-decision demodulated signals;
   combining each of the plurality of soft-decision demodulated signals with a diversity combiner to form a single combined signal;
   inputting the single combined signal into a single LDPC decoder; and
   receiving from the LDPC decoder a decoded signal.

2. The method of claim 1, wherein the step of combining each demodulated signal according to a predetermined scheme into a single combined signal, comprises the steps of:
   comparing a log-likelihood ratio (LLR) value of each respective bit across each non-coherently demodulated signal; and
   selecting, for each bit of the combined signal, the value of the respective bit across each demodulated signal having the highest LLR value.

3. The method of claim 2, wherein the highest LLR value is the LLR value with the largest magnitude.

4. The method of claim 1, wherein the step of combining each demodulated signal according to a predetermined scheme into a single combined signal, comprises the steps of:
   summing an LLR value of each respective bit across each soft-decision demodulated signal; and
   inputting the summed LLR values into LDPC decoder to determine an output codeword.

5. The method of claim 4, wherein the LLR values corresponding to each bit are summed with equal gain.

6. The method of claim 5, wherein each demodulator is a non-coherent demodulator.

7. A system for decoding a plurality of diverse signals, comprising:
   a plurality of non-coherent demodulators, each configured to receive one of a respective plurality of diverse low-density parity-check (LDPC) encoded and non-coherently modulated signals and to output a corresponding plurality of soft-decision demodulated signals;
   a diversity combiner, configured to combine the plurality of soft-decision demodulated signals into a single combined signal according to a predetermined scheme; and
   a low-density parity-check (LDPC) decoder configured to receive the single combined signal in the form of a log-likelihood ratio (LLR) values corresponding to each received bit and to output a decoded signal.

8. The system of claim 7, wherein the diversity combiner combines the plurality of demodulated signals by:
   comparing a low-density parity-check (LDPC) value of each respective bit across each demodulated signal; and
   selecting, for each bit of the combined signal, the LDPC value of the respective bit across each demodulated signal having the highest log-likelihood ratio (LLR) value.

9. The system of claim 8, wherein the highest LLR value is the LLR value with the largest magnitude.

10. The system of claim 7, wherein the diversity combiner combines the plurality of demodulated signals by:
    summing an LLR value of each respective bit across each demodulated signal; and
    inputting the summed LLR values into LDPC decoder to determine an output codeword.

11. The system of claim 10, wherein the LLR values are summed with equal gain.

* * * * *